US012595694B2

(12) United States Patent
Lin

(10) Patent No.: US 12,595,694 B2
(45) Date of Patent: Apr. 7, 2026

(54) LOCKING ASSEMBLY AND CHASSIS

(71) Applicant: Fulian Precision Electronics (Tianjin) Co., LTD., Tianjin (CN)

(72) Inventor: Chieh-Hsiang Lin, New Taipei (TW)

(73) Assignee: Fulian Precision Electronics (Tianjin) Co., LTD., Tianjin (CN)

( * ) Notice: Subject to any disclaimer, the term of this patent is extended or adjusted under 35 U.S.C. 154(b) by 394 days.

(21) Appl. No.: 18/213,962

(22) Filed: Jun. 26, 2023

(65) Prior Publication Data

US 2023/0417092 A1 Dec. 28, 2023

(30) Foreign Application Priority Data

Jun. 28, 2022 (CN) ......................... 202210754190.0

(51) Int. Cl.
*E05C 3/14* (2006.01)

(52) U.S. Cl.
CPC ...................................... *E05C 3/14* (2013.01)

(58) Field of Classification Search
CPC . E05C 3/14; G06F 1/187; G06F 1/181; G06F 1/183; H05K 7/1489; H05K 5/0217; H05K 5/0221; H05K 7/1401; H05K 7/1402; H05K 7/1487
See application file for complete search history.

(56) References Cited

U.S. PATENT DOCUMENTS

| | | | | |
|---|---|---|---|---|
| 8,848,378 B2 * | 9/2014 | Liao | H05K 7/1489 | 248/224.8 |
| 10,213,017 B2 * | 2/2019 | Chen | F16C 29/04 | |
| 10,368,460 B1 * | 7/2019 | Yang | H05K 7/1411 | |
| 10,667,424 B2 * | 5/2020 | Lin | H05K 7/1411 | |
| 11,134,578 B2 * | 9/2021 | Lin | G11B 33/124 | |
| 12,256,512 B2 * | 3/2025 | Lin | H05K 7/1487 | |
| 2013/0200672 A1 * | 8/2013 | Mo | B60N 2/2887 | 297/256.16 |
| 2014/0355209 A1 * | 12/2014 | Yin | H05K 7/1489 | 361/679.58 |
| 2019/0090634 A1 * | 3/2019 | Chen | A47B 88/483 | |
| 2019/0174648 A1 * | 6/2019 | Lin | H05K 7/1489 | |
| 2021/0274667 A1 * | 9/2021 | Lin | H05K 7/1401 | |

* cited by examiner

*Primary Examiner* — Ko H Chan
(74) *Attorney, Agent, or Firm* — ScienBiziP, P.C.

(57) ABSTRACT

A locking assembly for locking a first frame to a second frame, comprising a shell, a sliding component, a locking block and a transmission. The shell for connecting to the first frame. The sliding component slidably connected to the shell, and a guiding slot is defined on the sliding component. The locking block rotatably connected to the shell, a clamping notch is defined on the locking block and exposed from a top side of the shell for clamping a locking member on the second frame. The transmission group is connected to the sliding component by the guiding slot, the transmission group is further connected to the locking block. The transmission group is configured to rotate the locking block to clamp or unclamp the locking member, when the sliding component slides along a first direction to guide the transmission group by the guiding slot.

19 Claims, 14 Drawing Sheets

LOCKING ASSEMBLY AND CHASSIS

CROSS-REFERENCE TO RELATED APPLICATIONS

This application claims priority to Chinese Patent Application No. 202210754190.0 filed on Jun. 28, 2022, filed in China National Intellectual Property Administration, the contents of which are incorporated by reference herein.

FIELD

The subject matter herein generally relates to computer devices, and more particularly to a locking assembly and a chassis.

BACKGROUND

A data storage module is usually fixed in a chassis of a computer by a mounting bracket. The data storage module can be a hard disk, a floppy drive, or an optical drive to store data for the computer. The data storage module is fixed to the mounting bracket, and the chassis and the mounting bracket are secured by screws.

When the chassis and the mounting bracket need to be separated, the screws need to be removed one by one with the help of a screwdriver results in a tediously process. Moreover, it is difficult to store the screws. If some of the screws are lost, it is difficult to reassemble the chassis and the mounting bracket.

BRIEF DESCRIPTION OF THE DRAWINGS

Many aspects of the disclosure can be better understood with reference to the following drawings. The components in the drawings are not necessarily drawn to scale, the emphasis instead being placed upon clearly illustrating the principles of the disclosure. Moreover, in the drawings, like reference numerals designate corresponding parts throughout the several views.

DETAILED DESCRIPTION

Figure 1:
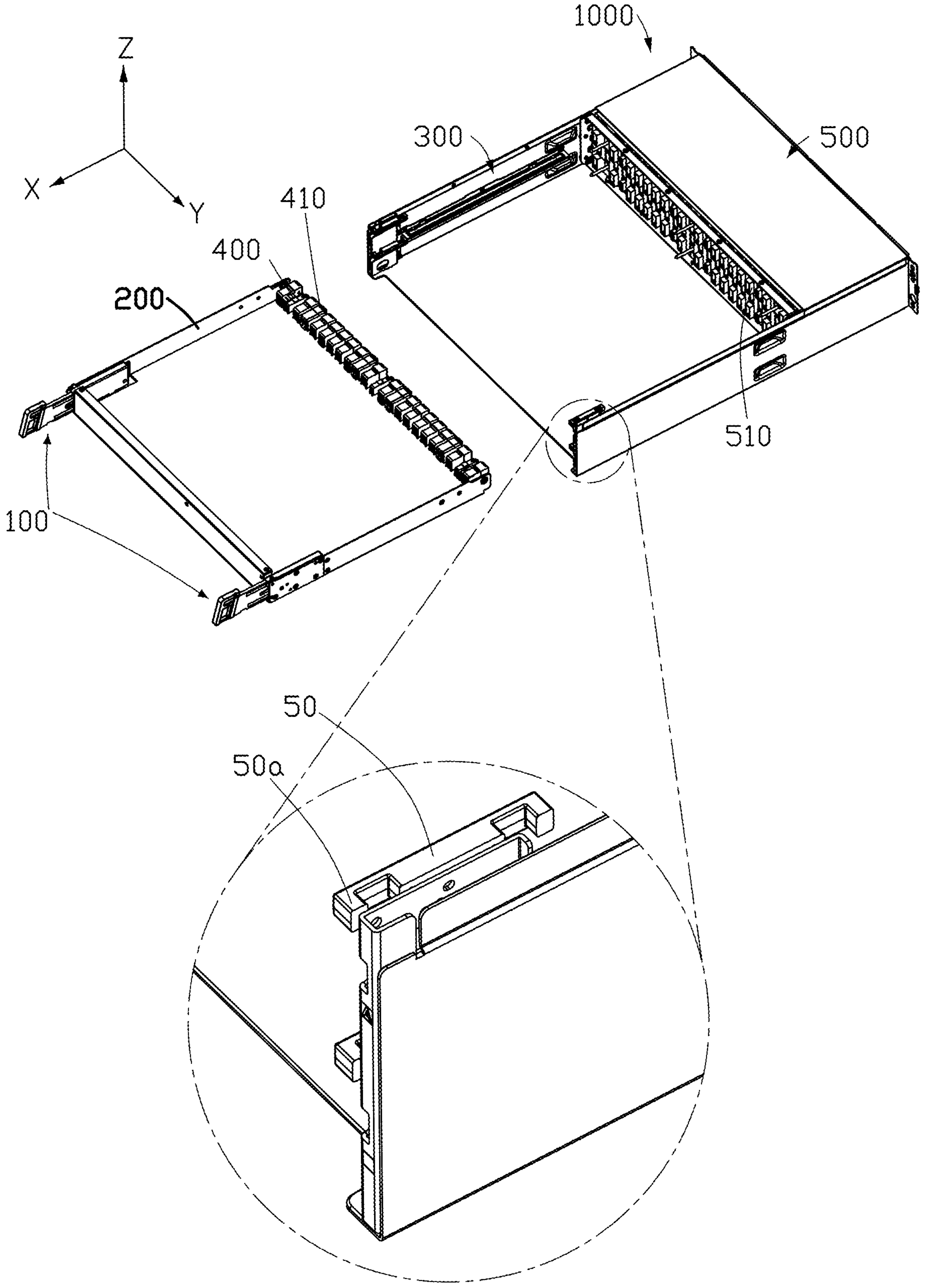
FIG. 1 is an exploded view of a side structure of a chassis in an embodiment of the present disclosure.

It will be appreciated that for simplicity and clarity of illustration, where appropriate, reference numerals have been repeated among the different figures to indicate corresponding or analogous elements. In addition, numerous specific details are set forth in order to provide a thorough understanding of the embodiments described herein. However, it will be understood by those of ordinary skill in the art that the embodiments described herein can be practiced without these specific details. In other instances, methods, procedures, and components have not been described in detail so as not to obscure the related relevant feature being described. Also, the description is not to be considered as limiting the scope of the embodiments described herein. The drawings are not necessarily to scale and the proportions of certain parts have been exaggerated to better illustrate details and features of the present disclosure.

The present disclosure, including the accompanying drawings, is illustrated by way of examples and not by way of limitation. Several definitions that apply throughout this disclosure will now be presented. It should be noted that references to “an” or “one” embodiment in this disclosure are not necessarily to the same embodiment, and such references mean “at least one.”

The term “coupled” is defined as connected, whether directly or indirectly through intervening components, and is not necessarily limited to physical connections. The connection can be such that the objects are permanently connected or releasably connected. The term “comprising” means “including, but not necessarily limited to”.

Without a given definition otherwise, all terms used have the same meaning as commonly understood by those skilled in the art. The terms used herein in the description of the present disclosure are for the purpose of describing specific embodiments only, and are not intended to limit the present disclosure.

As shown in FIG. 1, a chassis 1000 of a first embodiment includes a first frame 200 and a second frame 300. A plurality of first modules 400 is mounted in the first frame 200. A plurality of second modules 500 is mounted in the second frame 300. As the first frame 200 moves in the second frame 300 along a first direction X, the first modules 400 are moved to be close to or be away from the second modules 500. The first module 400 could be a data storage module. The second module 500 could be an HDD (Hard Disk Drive) module. The first module 400 has a first connector 410. The second module 500 has a second connector 510. When the first connector 410 is plugged into the second connector 510, the first module 400 and the second module 500 are electrically connected to pass electrical signals between the first module 400 and the second module 500.

The chassis 1000 further includes two locking assemblies 100 and two limiting components 50. The two locking assemblies 100 are mounted on both sides of the first frame 200. The two locking assemblies 100 are spaced in the second direction Y. The second direction Y is perpendicular to the first direction X. The two limiting components are mounted on the second frame 300. One of the two limiting components 50 is mounted on one side in the second direction Y of the second frame 300. The other of the two limiting components 50 is mounted on the other side in the second direction Y of the second frame 300. Each of the locking assemblies 100 couples to one of the limiting components 50 to lock the first frame 200 and the second frame 300 in the first direction X.

Figure 2:
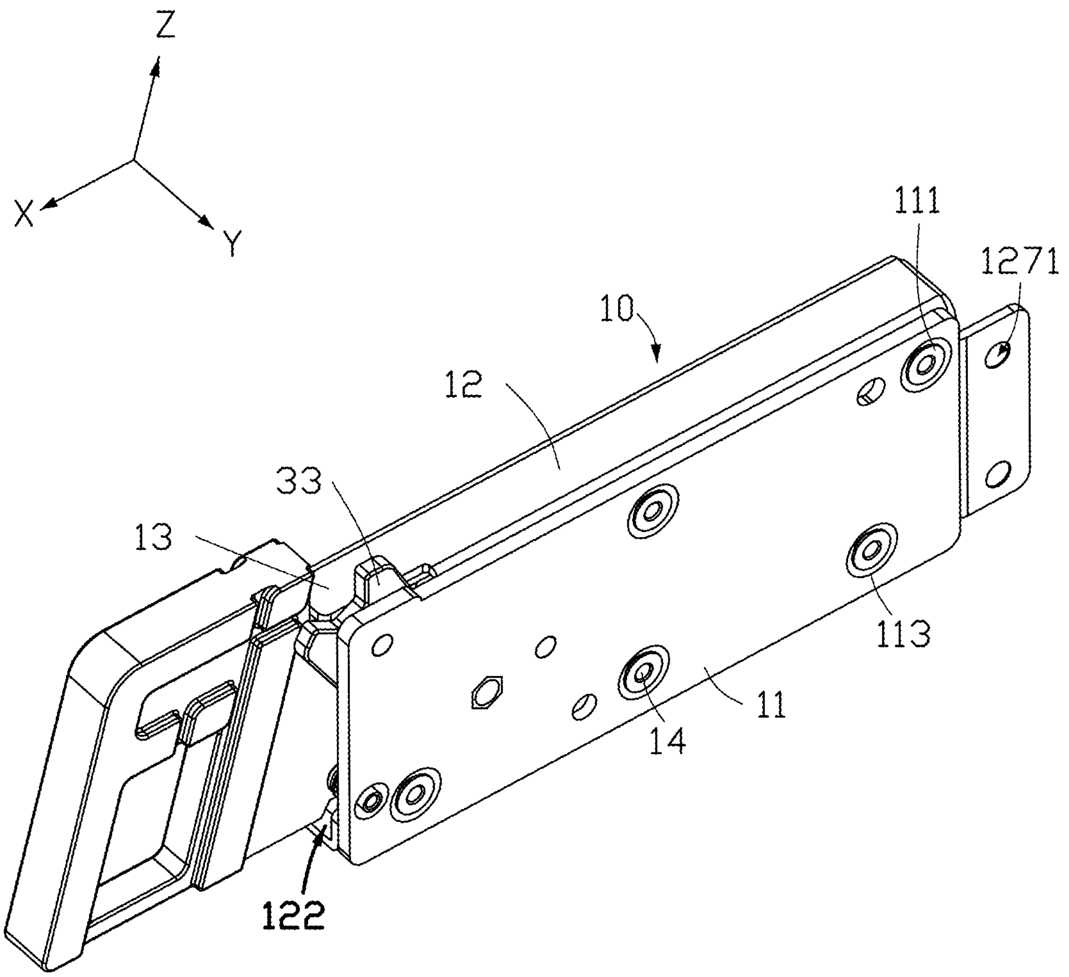
FIG. 2 is an isometric, assembled view of a locking assembly of the chassis of FIG. 1.

As shown in FIGS. 1 and 2, each of the two locking assemblies 100 includes a shell 10, a sliding component 20, a transmission group 30 (shown in FIG. 5) and a locking block 33. Each of the two limiting components 50 includes a locking member 50*a* (shown in FIG. 7). The limiting components 50 is coupled to the second frame 300. The locking block 33 is protruded from a top side 13 of the shell 10 to fit the locking member 50*a*. The top side 13 is one of the sides of the shell 10 in a third direction Z. The third direction Z perpendicular to the first direction X and the second direction Y. When the sliding component 20 is moved relatively to the shell 10 in the first direction X, the locking block 33 can be driven by the transmission group 30 to act on the locking member 50*a*. The locking block 33 can be blocked by the locking member 50*a* and the first frame 200 can be restricted to move away from the second frame 300 in the first direction X. When the first connector 410 of the first module 400 is plugged into the second connector 510 of the second module 500, the locking block 33 is acted on the locking member 50*a* for preventing the first connector 410 from detaching from the second connector 510 in the first direction X.

Figure 3:
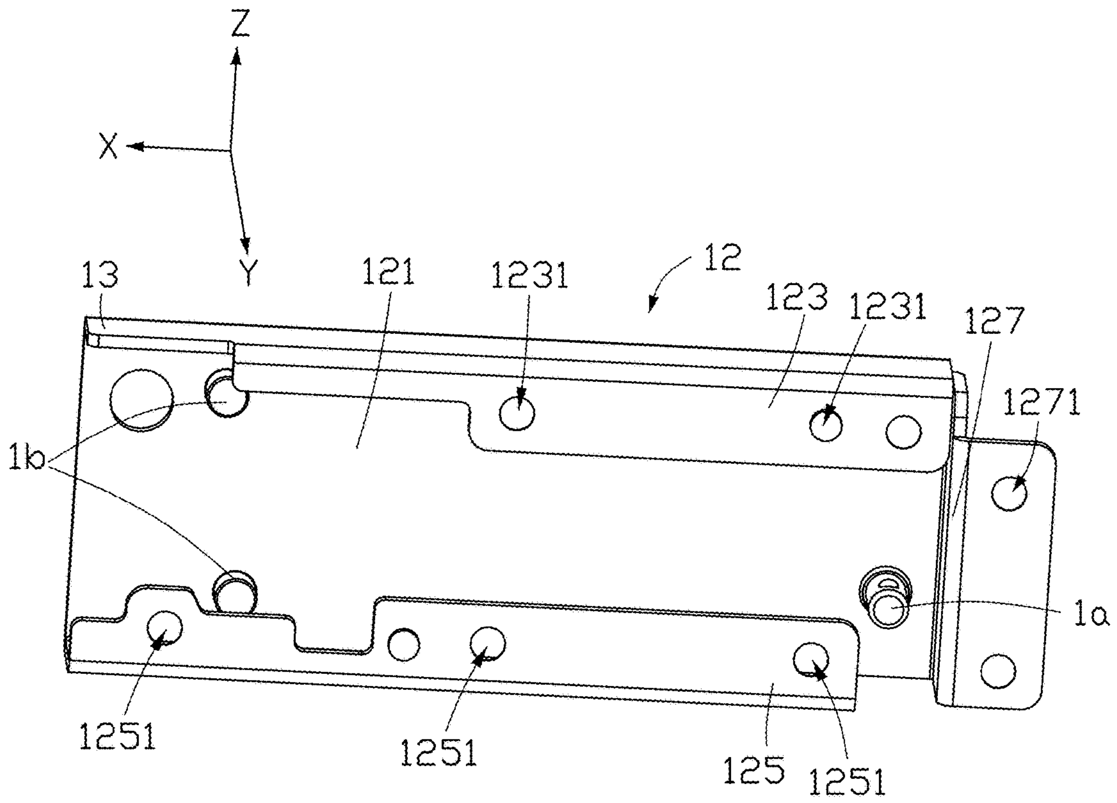
FIG. 3 is another isometric, assembled view of a second board of the locking assembly in FIG. 2.
Figure 4:
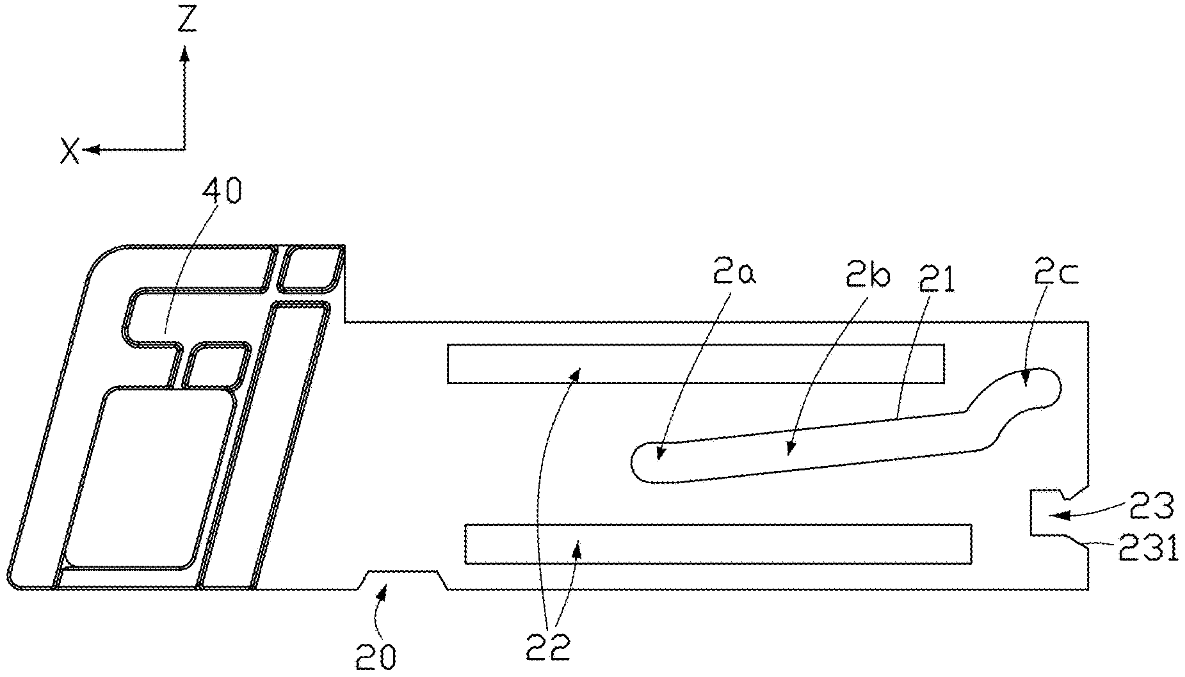
FIG. 4 is another isometric, assembled view of a sliding component of the locking assembly in FIG. 2.

As shown in FIGS. 2, 3 and 4, the sliding component 20 has two sliding slots 22. Each of the two sliding slots 22 extends along the first direction X. The shell 10 has two sliding columns 1*b*. Each of the two sliding columns 1*b* is inserted into one of the two sliding slots 22. The sliding component 20 can be guided in the first direction X relatively to the shell 10 by sliding the sliding column 1*b* in the sliding slot 22. Two sliding columns lb are inserted into two sliding slots 22 to limit the tilt of the sliding component 20 as the sliding component 20 slides against the shell 10. In some embodiments, the diameter of the sliding columns 1*b* is substantially equal to the slot width of the sliding slots 22 to prevent the sliding component 20 from wobbling on the guide member 1*b* along the third direction Z.

The sliding component 20 further has a guiding slot 21. The transmission group 30 includes a guiding column 32. The guiding column 32 is inserted into the guiding slot 21 and can be slid in the direction of the extension of the guiding slot 21. The guiding slot 21 has a first segment 2*a* and a second segment 2*b*. The first segment 2*a* and the second segment 2*b* are continuous. The first segment 2*a* roughly parallel to the first direction X. The second segment 2*b* is at an obtuse angle to the first segment 2*a*. As the sliding component 20 slides into the shell 10 along the first direction X, the guide column 32 is slid towards the top side 13 of the shell 10 under the guidance of the second segment 2*b*.

The shell 10 includes a first board 11 and a second board 12. The first board 11 is detachably connected to the second board 12. A cavity 122 is defined between the first board 11 and the second board 12 for holding the sliding component 20. The transmission group 30 is mounted between the first board 11 and the second board 12. The two sliding slots 22 and the guiding slot 21 are located on the second board 12. The sliding component can be inserted between the first board 11 and the second board 12 by the guiding of the sliding slots 22 to drive the transmission group 30. The second board 12 includes a plate 121, a first flap 123 and a second flap 125. The first flap 123 and the second flap 125 are coupled to each side of the plate 121. The first flap 123 extends in the direction towards the second flap 125. The second flap 125 extends in the direction towards the first flap 123. One side of the sliding component 20 is held by the first flap 123 and the plate 121, the other side of the sliding component 20 is held by the second flap 125 and the plate 121. The first flap 123 and the second flap 125 are located between the plate 121 and the first board 11. The sliding component 20 is restricted by the first flap 123 and the second flap 125 from approaching the first board 11 along the second direction Y.

Two first mounting holes 1231 are defined on the first flap 123. Two second mounting holes 111 are defined on the first board 11. Three third mounting holes 1251 are defined on the second flap 125. Three fourth mounting holes 113 are defined on the first board 11. The shell 10 further includes five fasteners 14. Each of the five fasteners 14 could be a rivet or a screw. Two of the fasteners 14 pass through the first mounting hole 1231 and the second mounting hole 111 to secure the first board 11 and the second board 12. Three of the fasteners 14 pass through the third mounting hole 1251 and the fourth mounting hole 113 to secure the first board 11 and the second board 12.

The second board 12 further includes a third flap 127. The third flap 127 is located at one end of the plate 121 along the first direction X. The third flap 127 is configured to prevent the sliding component 20 from passing through the shell 10 and acting on the first modules 400. Two fifth mounting holes 1271 are defined on the third flap 127 for detachably mounting the shell 10 on the first frame 200.

Figure 5:
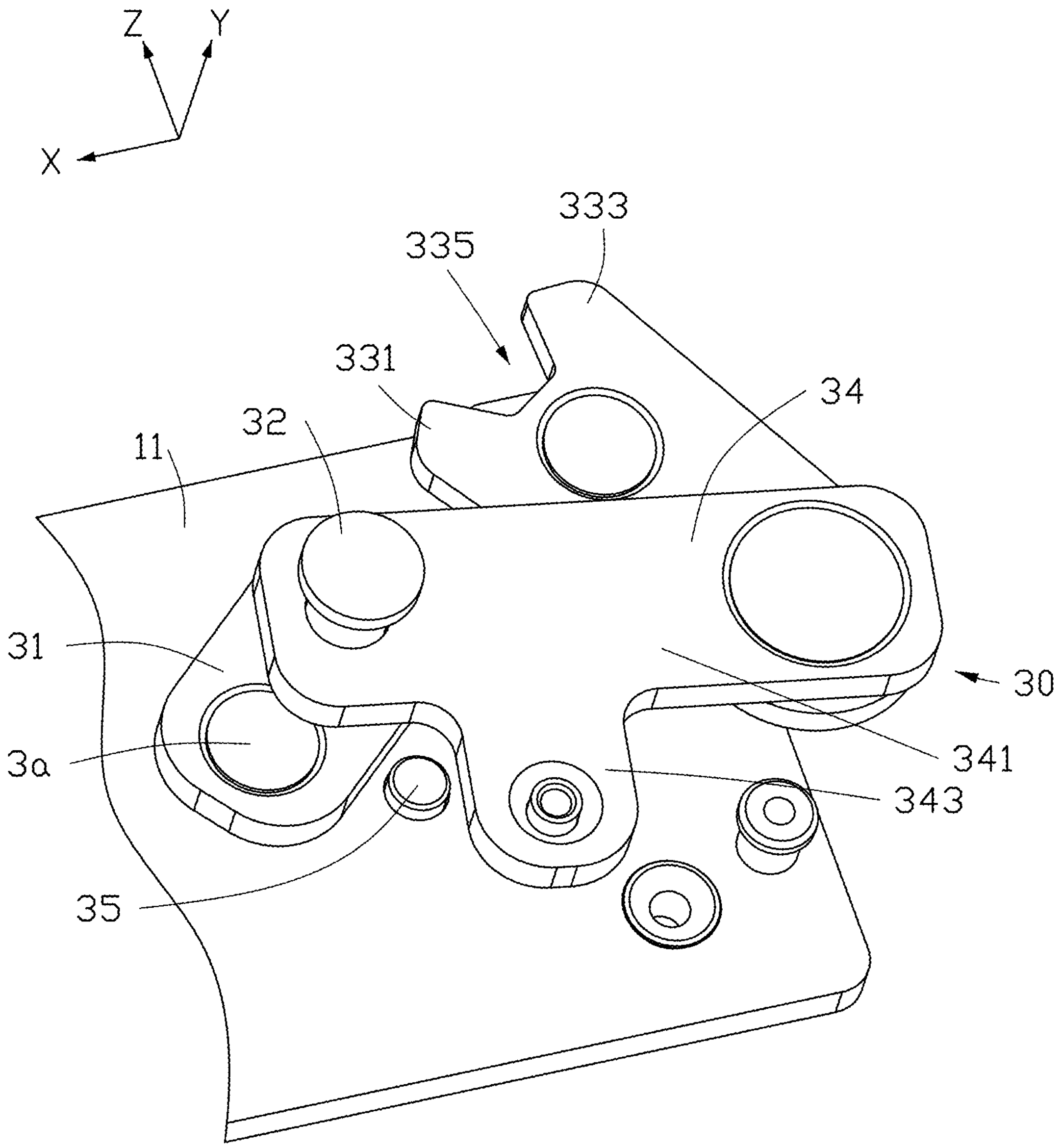
FIG. 5 is another assembled, partial view of a transmission group and a locking block of the locking assembly in FIG. 2.
Figure 6:
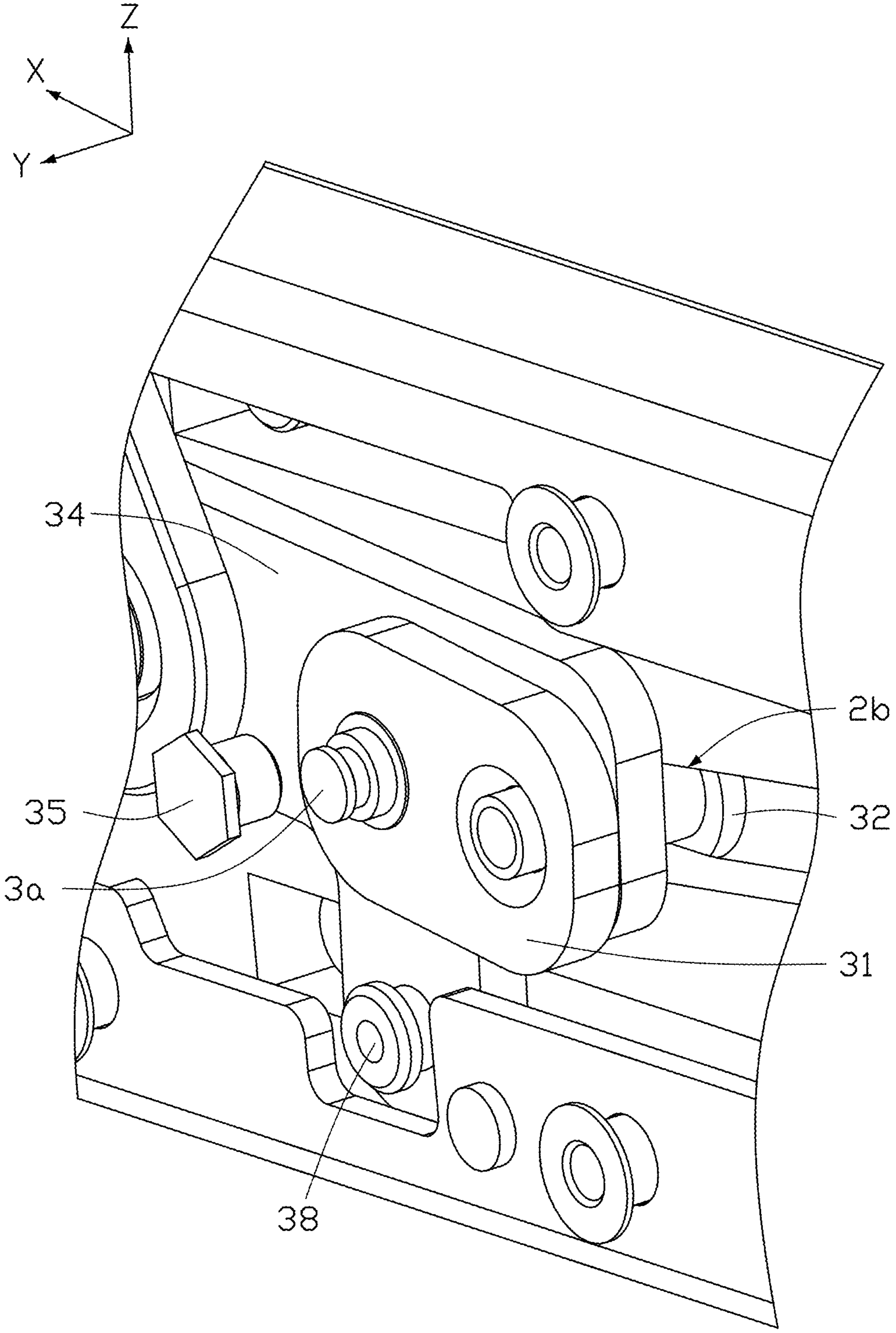
FIG. 6 is another assembled, partial view of the transmission group and the locking block of the locking assembly in FIG. 2.

As shown in FIGS. 5 and 6, the transmission group 30 further includes a first block 31 and a second block 34. The first block 31 is rotatably connected to the first board 11 around a first axis 3*a*. The guiding column 32 passes through a first hole in the first block 31 and a second hole in the second block 34, so that the guiding column 32 is rotatably connected to both the first block 31 and the second block 34. The second block 34 is rotatably connected to the locking block 33 around a second axis 3*b*. The locking block 33 is rotatably connected to the first board 11 around a third axis 3*c*. The first axis 3*a*, the second axis 3*b* and the third axis 3*c* are parallel to the second direction Y. The locking block 33 includes a first clamping part 331 and a second clamping part 333. A clamping notch 335 is formed between the first clamping part 331 and the second clamping part 333.

Once the locking member 50*a* is in the clamping notch 335 and the guiding column 32 is in the first segment 2*a*, and the first axis 3*a*, the second axis 3*b* and the guide column 32 are configured in approximately a same straight line, which is parallel to the first direction X. The first axis 3*a* is located between the second axis 3*b* and the guide projection. If the locking block 33 tends to move along the first direction X relative to the locking member 50*a*, the locking member 50*a* generates a thrust that tends to push the locking block 33 rotate around the third axis 3*c*. The locking block 33 tends to push the second block 34 along the first direction X. The second segment 2*b* is at the obtuse angle to the first segment 2*a*. However, the first axis 3*a*, the second axis 3*b* and the guiding column 32 are configured in the straight line parallel to the first direction X that it is difficult to generate a third direction Zal force to bring the guiding column 32 into the second segment 2*b*. The relative positions of the locking block 33 and locking member 50*a* in the first direction X are locked. Thus, the relative positions of the first frame 200 and the second frame 300 in the first direction X are locked.

The guiding slot 21 further has a third segment 2*c*. The third segment 2*c* is at the end of the second segment 2*b* away from the first segment 2*a*. The third segment 2*c* is a curved slot with the axis of the curved slot located on the side of the curved slot away from the top side 13. The guiding column 32 can enter the third segment 2*c* from the second segment 2*b* when the sliding component 20 is pulled out from the shell 10 along the first direction X. The transmission group 30 further includes an elastic member 36. The elastic member 36 could be a spring. One end of the elastic member 36 is connected to the first board 11, the other end of the elastic member 36 is connected to the second block 34.

The second block 34 has a first part 341 and a second part 343. The second part is fixedly connected to the first part. The second part extends perpendicular to the first part from the middle area of the first part. One end of the first part is rotatably connected to the guiding column 32. The other end of the first part is rotatably connected to the locking block 33 around the third axis 3*c*. The first board 11 includes a first connecting column 37. The second part 343 includes a second connecting column 38. One end of the elastic member 36 is connected to the first connecting column 37. The other end of the elastic member 36 is connected to the second connecting column 38.

The elastic member 36 makes the second block 34 tend to drive the guiding column 32 towards the first segment 2*a*. When the sliding component 20 moves in the first direction X relative to the shell 10 so that the guiding column 32 slides into the end of the third segment 2*c* away from the second segment 2*b*. The line of the guiding column 32 to the second axis 3*b* is parallel to the third direction Z. The elastic member 36 drives the guiding column 32 close to the second segment 2*b* along the third segment 2*c*, so that the first block 31 rotates around the first axis 3*a*. Meanwhile, the second block 34 moves towards the first segment 2*a*, so that the locking block 33 rotates around the second axis 3*b* to unlock the locking member 50*a*.

The shell 10 further includes a stopper 35. The stopper 35 is mounted on the first board 11 and extends towards the second board 12. When the elastic member 36 drives the guiding column 32 close to the second segment 2*b* along the third segment 2*c*, the first block 31 can be blocked by the stopper 35 to prevent the first block 31 from rotating around the first axis 3*a*. So that, the guiding column 32 stops at the end of the third segment 2*c* near the second segment 2*b*, which prevents the sliding component 20 from moving away from the shell 10 along the first direction X.

The second block 34 is located on the side of the first block 31 away from the first board 11. The dimension of the stopper 35 along the second direction Y is smaller than the dimension of the first block 31 along the second direction Y, so that the stopper 35 cannot extend into the area where the second block 34 is located to prevent the stopper 35 from affecting the movement of the second block 34.

Referring to FIG. 4, the sliding component 20 further has a limiting notch 23, which is located at the side of the sliding component 20 away from the first segment 2*a*. The shell 10 further includes a limiting column 1*a*. The limiting notch 23 is configured to accommodate the limiting column 1*a*, and the movement of the sliding component 20 can be restricted by the cooperation of the limiting notch 23 and the limiting column 1*a*.

The limiting notch 23 has an opening 231 for the limiting column 1*a* to enter the limiting notch 23 through the opening 231. The limiting column 1*a* and the limiting notch 23 may limit the movement of the sliding component 20 by interference fitting. In some embodiments, the opening 231 of the limiting notch 23 is provided with a closing, so that the size of the opening 231 is smaller than the diameter of the limiting column 1*a* before deformed by force. The limiting column 1*a* is made of elastic material. When the sliding component 20 moves along the first direction X to drive the limiting notch 23 towards the limiting column 1*a*, the closing of the limiting notch 23 can squeeze the limiting column 1*a*. The limiting column 1*a* is elastically deformed by the closing to enter the limiting notch 23 through the opening 231. After the limiting column 1*a* enters the limiting notch 23, the closing of the limiting notch 23 can the sliding component 20 in a locked state. Meanwhile, if the external force on sliding component 20 is not sufficient to deform the limiting column 1*a* to pass through the opening 231, the position of the sliding component 20 with the shell 10 in the first direction X remains stable.

Figure 7:
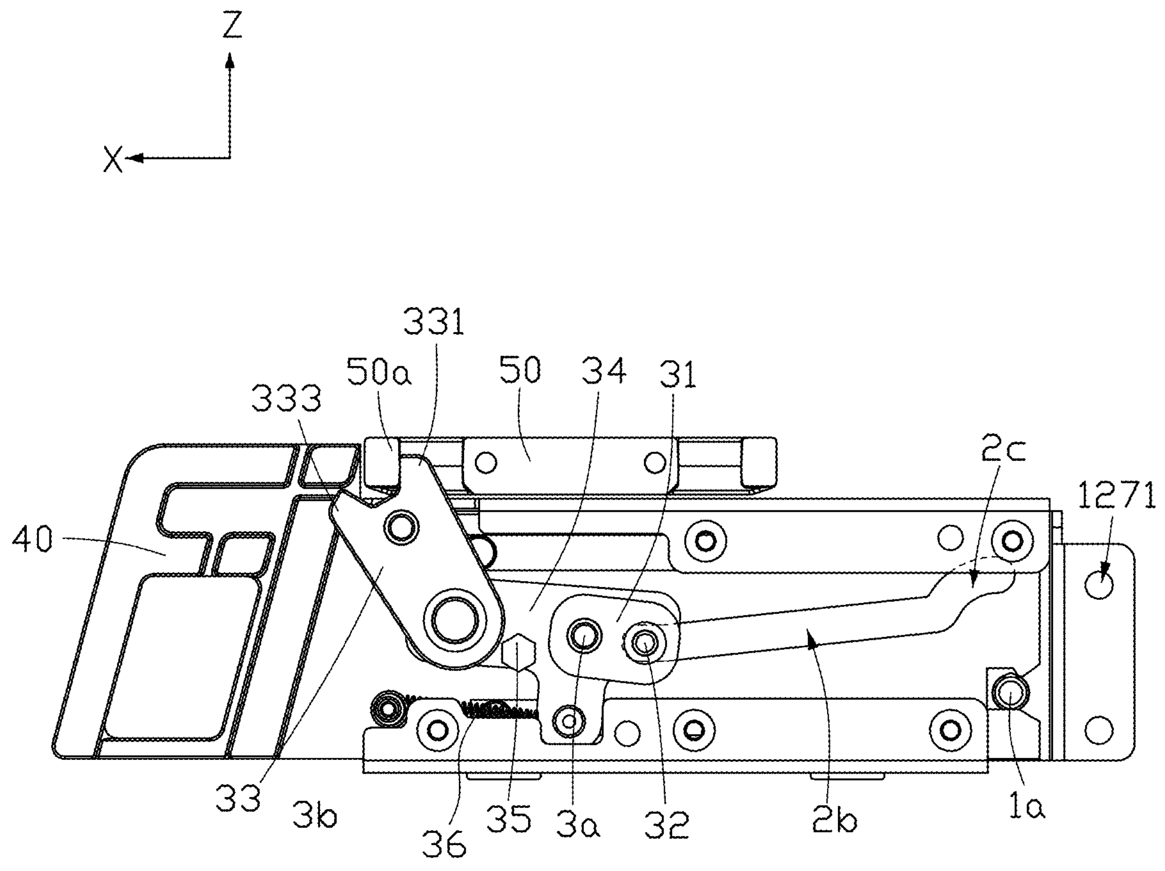
FIG. 7 is another assembled view of the transmission group, the locking block and the sliding component of the locking assembly in FIG. 2, a first clamping part of the locking block is acting on a locking member.
Figure 8:
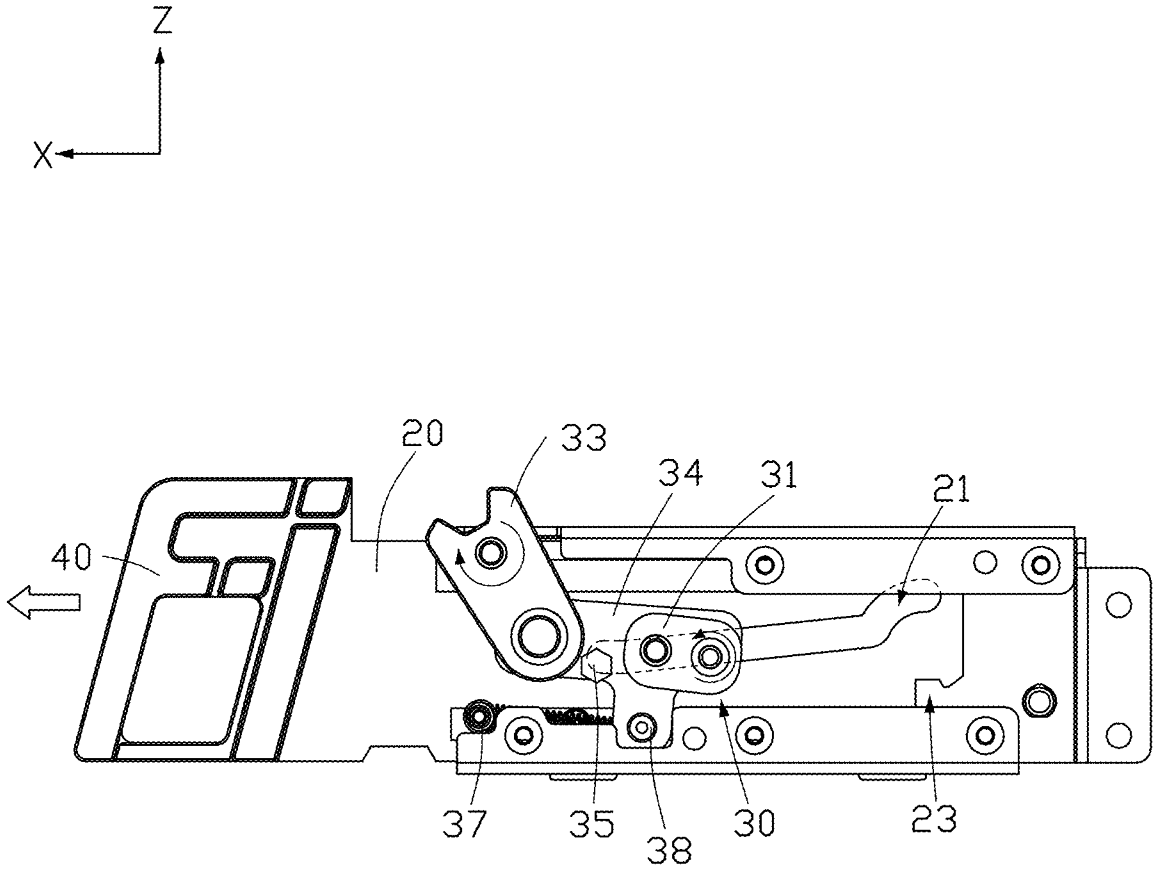
FIG. 8 is another assembled view of the transmission group, the locking block and the sliding component of the locking assembly in FIG. 2, the sliding component is sliding along a first direction to away from the second board.
Figure 9:
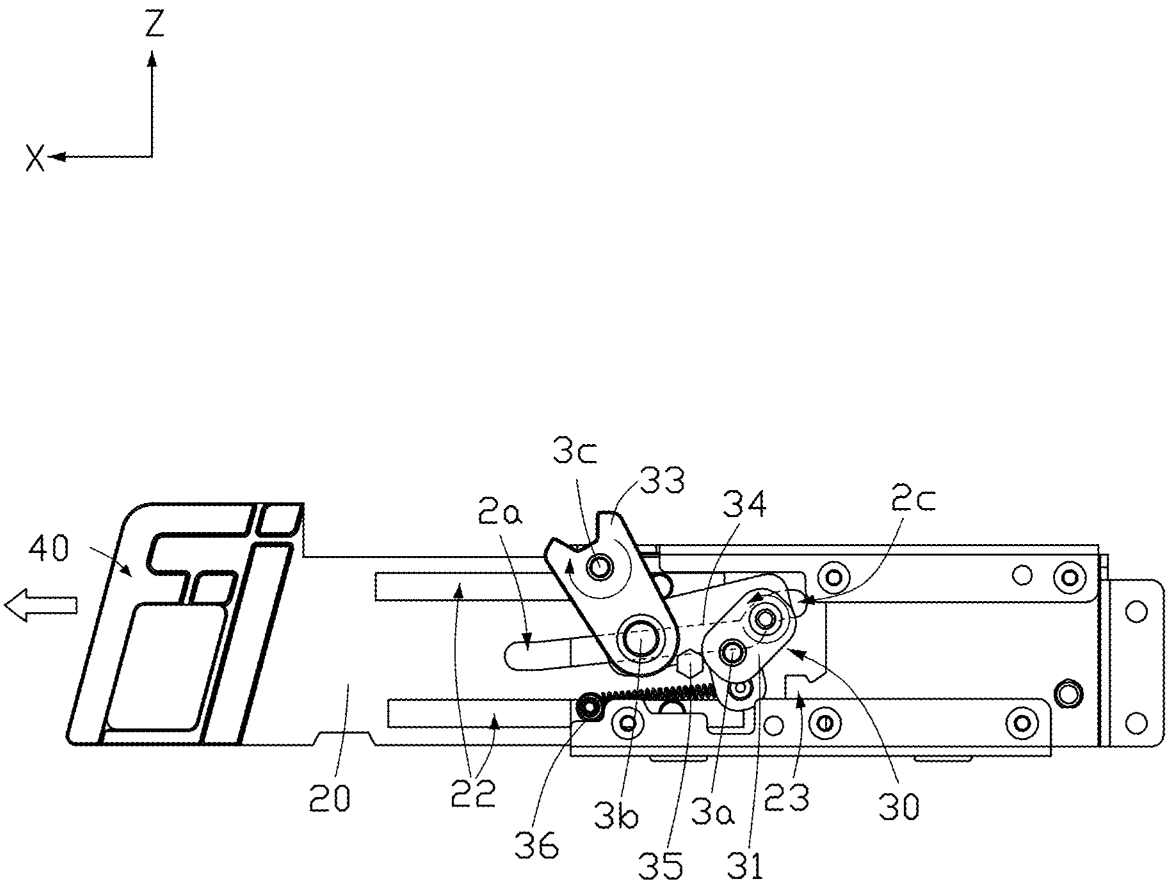
FIG. 9 is another assembled view of the transmission group, the locking block and the sliding component of the locking assembly in FIG. 2, the sliding component is sliding along the first direction to away from the second board.

As shown in FIG. 7, when the first frame 200 is locked in the second frame 300, the locking assembly 100 is located with the second frame 300, and the first clamping part 331 acts on the locking member 50*a* of the second frame 300. The locking member trends to generate a torque on the locking block 33 to rotate the locking block 33 around the third axis 3*c*. At the same time, the second block 34 trends to rotate through the locking block 33, and drive the guiding column 32 from the first segment 2*a* to the second segment 2*b*. However, since the line connecting the first axis 3*a*, the second axis 3*b* and the guide pillar 32 is approximately parallel to the first direction X, the torque generated by the locking member 50*a* is difficult to drive the guiding column 32 from the first segment 2*a* to the second segment 2*b*.

Figure 10:
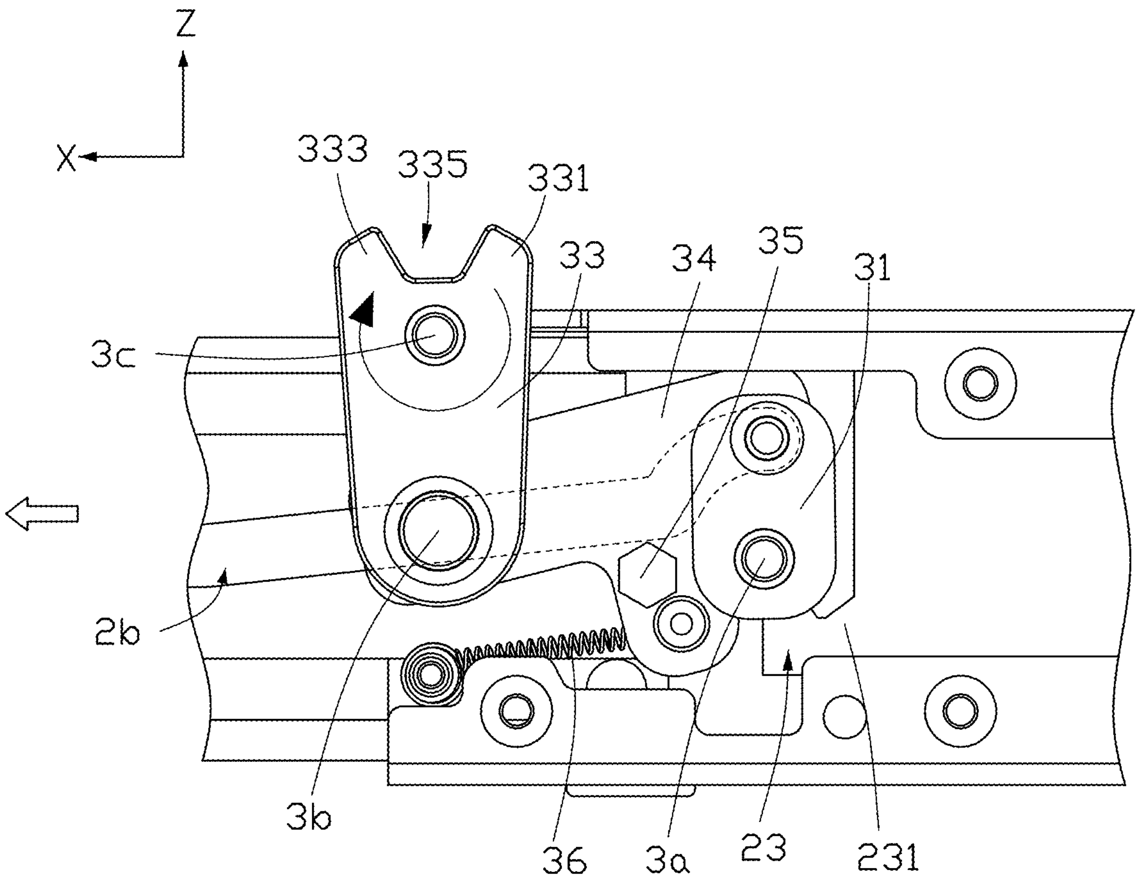
FIG. 10 is another assembled, partial view of the transmission group and the locking block of the locking assembly in FIG. 2, the sliding component is sliding along the first direction to away from the second board.

As shown in FIG. 10, in the process of pulling the first frame 200 from the second frame 300 along the first direction X, when the guide column 32 moves to the end of the third segment 2*c*, the sliding component 20 cannot be pulled along the first direction X relative the shell 10 further. However, as the elastic member 36 pulls the second block 34, which causes the second block 34 to drive the first block 31 to rotate around the first axis 3*a*, the guiding column 32 slides from the third segment 2*c* toward the second segment 2*b*.

FIGS. 7 to 11 show the transition of the locking assembly 100 from a locked state to an unlocked state during the process of pulling the first frame 200 out of the second frame 300.

As shown in FIGS. 7 to 10, a first extraction stage is: the first frame 200 is pulled out from the second frame 300 by pulling the sliding component 20, so that the sliding component 20 moves forward relative to the shell 10 and the guiding column 32 moves from the first segment 2*a* to the second segment 2*b*. Since the extension direction of the second segment 2*b* is inclined to the first direction X, the guiding column 32 has a displacement in the third direction Z when sliding along the second segment 2*b*. The first block 31 rotates around the first axis 3*a* driven by the guiding column 32. The second block 34 rotates driven by the guiding column 32, and the locking block 33 rotates driven by the second block 34, so that the first clamping part 331 is gradually removed from the locking member 50*a*. Continuously pulling out the sliding component 20 from the shell 10, so that the guiding column 32 moves from the second segment 2*b* to the third segment 2*c*. The third segment 2*c* is a curved slot with the axis of the curved slot located on the side of the curved slot away from the top side 13. When the guiding column 32 moves to the end of the third segment 2*c*, the line of the guiding column 32 to the second axis 3*b* is parallel to the third direction Z.

Figure 11:
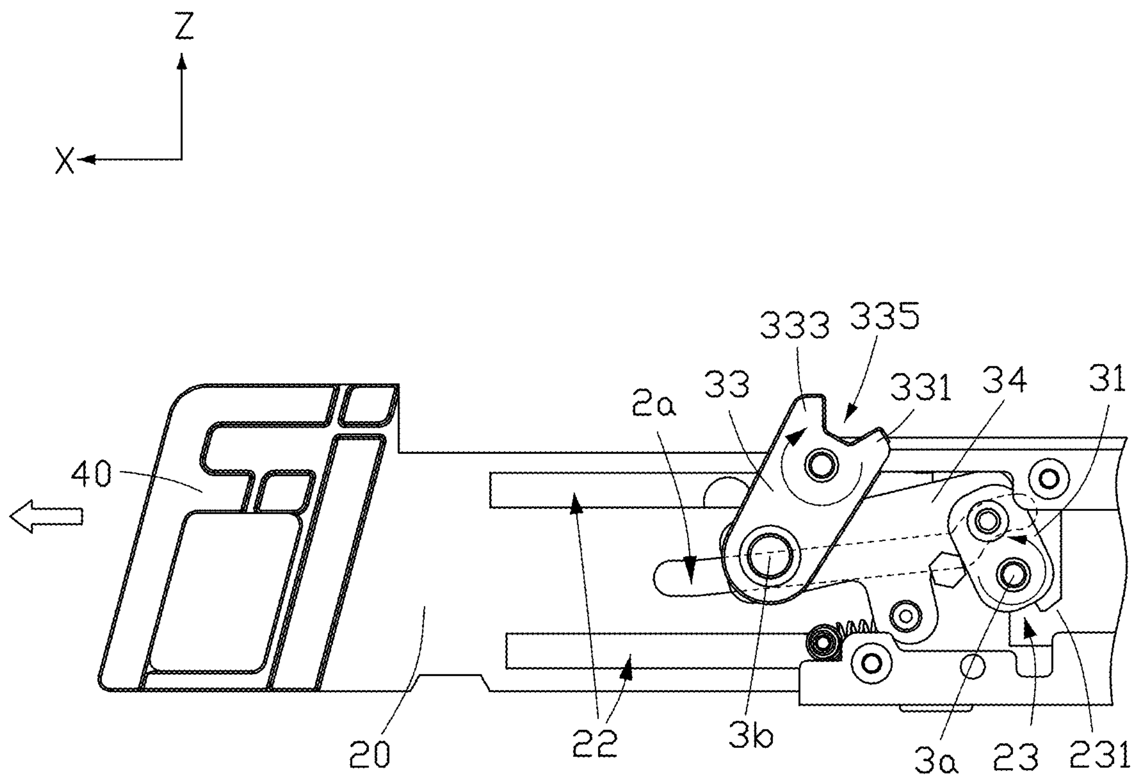
FIG. 11 is another assembled, partial view of the transmission group and the locking block of the locking assembly in FIG. 2, the sliding component is sliding along the first direction to away from the second board.
Figure 12:
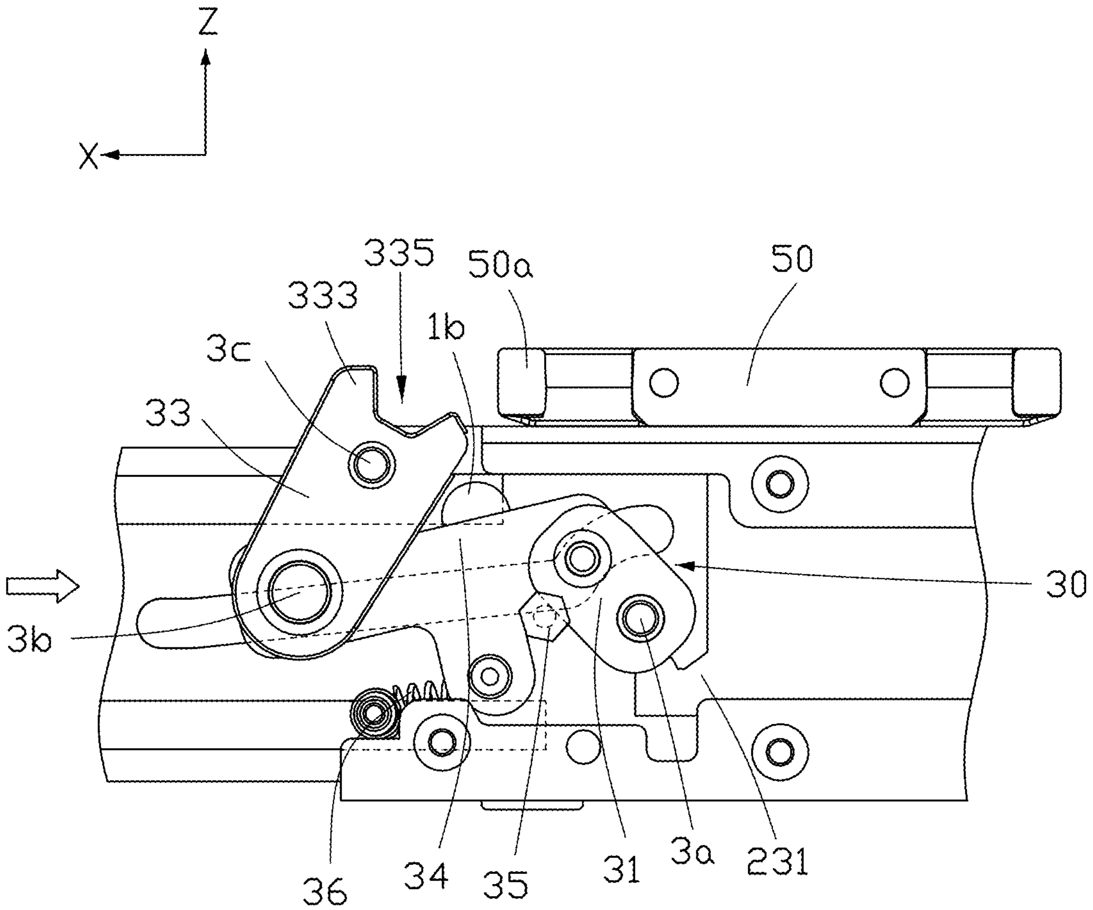
FIG. 12 is another assembled, partial view of the transmission group and the locking block of the locking assembly in FIG. 2, the sliding component is sliding along the first direction to close to the second board.

As shown in FIGS. 10 to 12, the second extraction stage is: The elastic member 36 drives the guiding column 32 close to the second segment 2*b* along the third segment 2*c*, so that the first block 31 rotates around the first axis 3*a*. The first block 31 rotates the locking block 33 around the second axis 3*b* through the second block 34, and the locking block 33 drives the clamping notch 335 around the locking member 50*a* to unlock the locking member 50*a* and the clamping notch 335. Since the locking member 50*a* is out of the clamping notch 335, the first frame 200 can be moved away from the second frame 300 along the first direction X by continuously pulling the sliding component 20 in the first direction X.

FIGS. 12 to 15 show the transition of the locking assembly 100 from a unlocked state to a locked state during the process of pushing the first frame 200 into the second frame 300.

Figure 13:
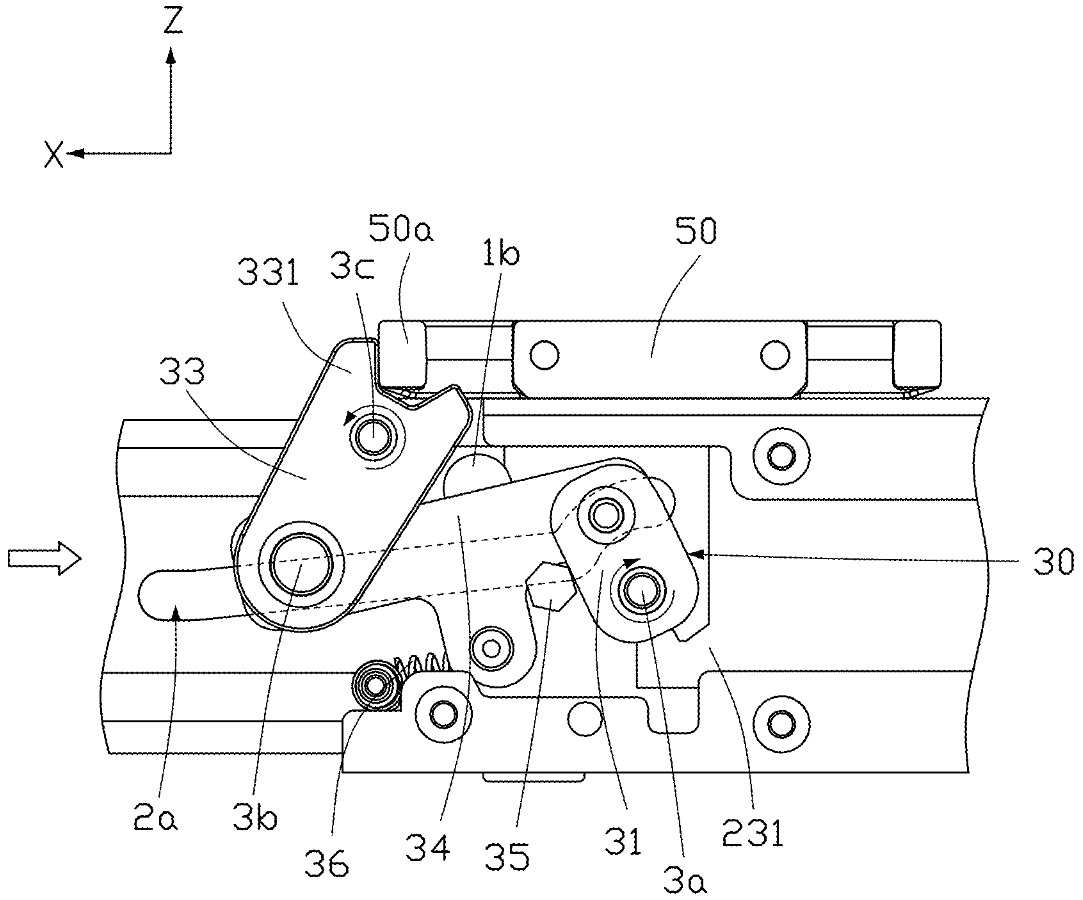
FIG. 13 is another assembled, partial view of the transmission group and the locking block of the locking assembly in FIG. 2, a second clamping part of the locking block is acting on the locking member.

As shown in FIGS. 12 and 13, a first push-in stage is: the first frame 200 is pushed into the second frame 300 along the first direction X. Meanwhile, the sliding component 20 is stationary relative to the shell 10, the second clamping part 333 is not in contact with the locking member 50*a*, and the guiding column 32 is in the third segment 2*c*.

Figure 14:
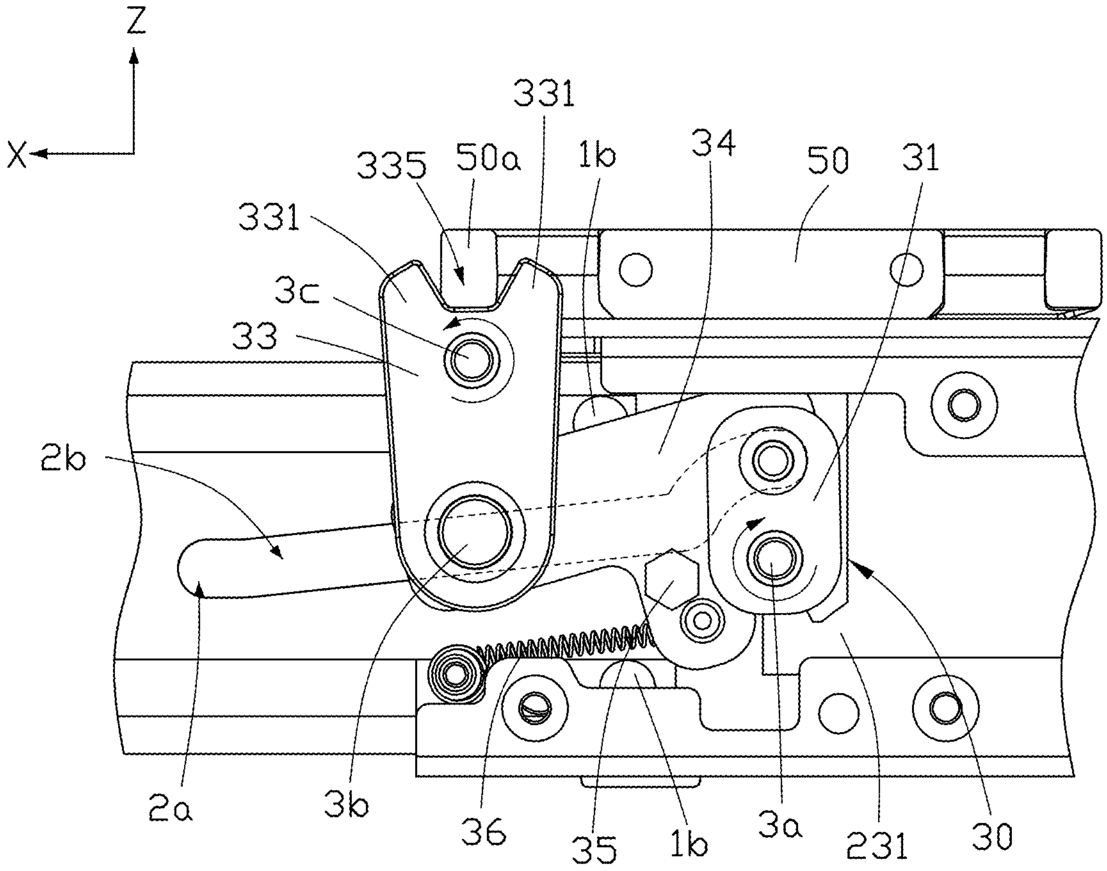
FIG. 14 is another assembled, partial view of the transmission group and the locking block of the locking assembly in FIG. 2, the sliding component is sliding along the first direction to close to the second board.

As shown in FIGS. 13 and 14, a second push-in stage is: when the second clamping part 333 contacts the locking member 50*a*, continue to push the sliding component 20, the locking block 33 rotates under the block of the locking member 50*a* so that the locking member 50*a* gets into the clamping notch 335. When the locking block 33 rotates, the locking block 33 drives the first block 31 to rotate through the second block 34, and the guiding column 32 moves toward the end of the third segment 2*c*.

Figure 15:
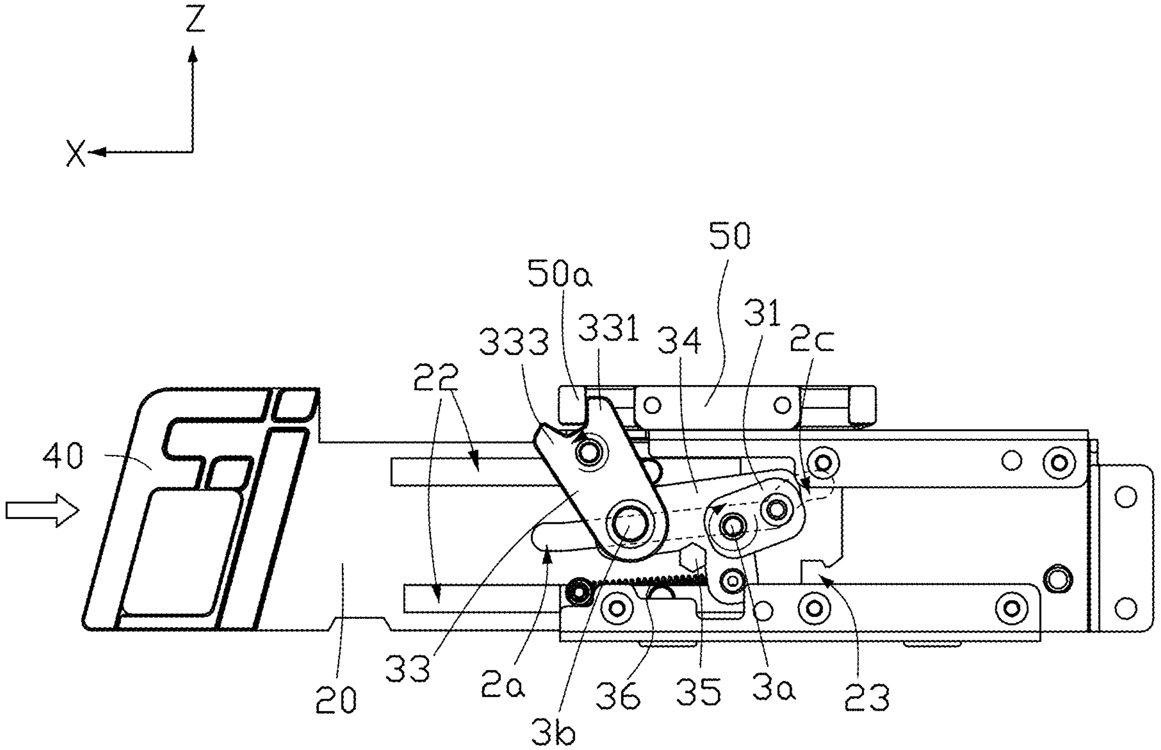
FIG. 15 is another assembled view of the transmission group, the locking block and the sliding component of the locking assembly in FIG. 2, the sliding component is sliding along the first direction to close to the second board.

As shown in FIGS. 14 and 15, the third push-in stage is: when the guiding column 32 moves to the end of the third segment 2*c*, continue to push the sliding component 20, and the guiding column 32 moves into the second section 2*b*. Since the extension direction of the second segment 2*b* is inclined to the first direction X, the moving of the column rotates the first block 31 around the first axis 3*a*, and moves the guiding column 32 to the side of the first axis 3*a* away from the second axis 3*b*.

As shown in FIGS. 7 and 15, the fourth push-in stage is: when the guiding column 32 moves to the first segment 2*a*, the first clamping part 331 acts on the locking member 50*a*. The first frame 200 can be pushed into the second frame 300 by pushing the sliding component 20 along the first direction X. As the first frame 200 is pushed into the second frame 300, the first connector 410 of the first module 400 can be plugged into the second connector 510 of the second module 500.

The locking assembly 100 further includes a handle 40. The handle 40 is connected to the sliding component 20. Users can hold the handle 40 and pull the handle 40 along the first direction X for driving the sliding component 20 along the first direction X.

The embodiments shown and described above are only examples. Even though numerous characteristics and advantages of the present technology have been set forth in the foregoing description, together with details of the structure and function of the present disclosure, the disclosure is illustrative only, and changes may be made in the detail, including in matters of shape, size, and arrangement of the parts within the principles of the present disclosure, up to and including, the full extent established by the broad general meaning of the terms used in the claims.

What is claimed is:

1. A locking assembly for locking a first frame to a second frame, comprising:

a shell configured for connecting to the first frame;

a sliding component slidably connected to the shell, and a guiding slot is defined on the sliding component;

a locking block rotatably connected to the shell, a clamping notch is defined on the locking block and exposed from a top side of the shell for clamping a locking member on the second frame;

a transmission group connected to the sliding component through the guiding slot, the transmission group is further connected to the locking block, the transmission group comprises a first block, a second block, and a guiding column, the guiding column is rotatably connected to the first block or the second block, the guiding column is slidably connected to the guiding slot, one end of the first block is rotatably connected to the shell around a first axis, another end of the first block is rotatably connected to the second block, the second block is rotatably connected to the locking block around a second axis for rotating the locking block around a third axis, and the first axis, the second axis, and the third axis are parallel to a second direction, the second direction is perpendicular to the first direction; and the transmission group is configured to rotate the locking block to clamp or unclamp the locking member, when the sliding component slides along a first direction to guide the transmission group in the guiding slot.

2. The locking assembly of claim 1, wherein the shell comprises a first board and a second board, and a cavity is formed between the first board and the second board for holding the sliding component.

3. The locking assembly of claim 1, wherein a first hole is defined on the first block, a second hole is defined on the second block, and the guiding column extends through the first hole and the second hole.

4. The locking assembly of claim 1, wherein the guiding slot has a first segment and a second segment set consecutively, the first segment is parallel to the first direction, the second segment is at an obtuse angle to the first direction, and along a third direction, the second segment extends from the first segment to the top side of the shell, the third direction is perpendicular to the first direction and the second direction.

5. The locking assembly of claim 4, wherein the guiding slot further has a third segment, and the third segment is a curved slot with an axis of the curved slot located on a side of the curved slot away from the top side of the shell.

6. The locking assembly of claim 1, wherein the transmission group further comprises an elastic member, and one end of the elastic member is connected to the first board, another end of the elastic member is connected to the second block.

7. The locking assembly of claim 6, wherein the second block comprises a first part and a second part, one end of the first part is rotatably connected to the guiding column, another end of the first part is rotatably connected to the locking block around the third axis, and the second part extends perpendicular to the first part and connects the elastic member.

8. The locking assembly of claim 2, wherein, the shell further includes a stopper, and the stopper is mounted on the first board and extends towards the second board for stopping a rotation of the first block.

9. The locking assembly of claim 8, wherein the second block is located at a side of the first block away from the first board, and a dimension of the stopper is smaller than a dimension of the first block along the second direction.

10. The locking assembly of claim 1, wherein the second board comprises a plate, a first flap, and a second flap, the first flap and the second flap are coupled to each side of the plate along a third direction, the third direction is perpendicular to the first direction and the second direction, and one side of the sliding component is held by the first flap and the plate, another side of the sliding component is held by the second flap and the plate.

11. The locking assembly of claim 10, wherein a first mounting hole is defined on the first flap, a second mounting hole is defined on the first board, and the first board and the second board are connected by a fastener extending through the first mounting hole and the second mounting hole.

12. The locking assembly of claim 10, wherein a third mounting hole is defined on the second flap, a fourth mounting hole is defined on the first board, and the first board and the second board are connected by a fastener extending through the third mounting hole and the fourth mounting hole.

13. The locking assembly of claim 10, wherein the second board further comprises a third flap, the third flap is located at one end of the plate along the first direction for stopping the sliding of the sliding component.

14. The locking assembly of claim 13, wherein a fifth mounting hole is defined on the third flap for mounting the second board on the first frame.

15. The locking assembly of claim 1, wherein the sliding component further has a limiting notch, the shell further comprises a limiting column, and the limiting notch is configured to accommodate the limiting column along the first direction for resisting a movement of the sliding component.

16. The locking assembly of claim 1, wherein the sliding component has two sliding slots, each of the two sliding slots extends along the first direction, and the shell has two sliding columns, each of the two sliding columns is inserted into one of the two sliding slots.

17. The locking assembly of claim 1, further comprising a handle, wherein the handle is connected to the sliding component.

18. A chassis, comprising:

a first frame;

a second frame comprising a locking member; and a locking assembly comprising:

a shell connected to the first frame;

a sliding component slidably connected to the shell, and a guiding slot is defined on the sliding component;

a locking block rotatably connected to the shell, a clamping notch is defined on the locking block and exposed from a top side of the shell for clamping the locking member;

a transmission group connected to the sliding component by the guiding slot, the transmission group is further connected to the locking block, the transmission group comprises a first block, a second block, and a guiding column, the guiding column is rotatably connected to the first block or the second block, the guiding column is slidably connected to the guiding slot, one end of the first block is rotatably connected to the shell around a first axis, another end of the first block is rotatably connected to the second block, the second block is rotatably connected to the locking block around a second axis for rotating the locking block around a third axis, and the first axis, the second axis, and the third axis are parallel to a second direction, the second direction is perpendicular to the first direction; and the transmission group is configured to rotate the locking block to clamp or unclamp the locking member, when the sliding component slides along a first direction to guide the transmission group by the guiding slot.

19. The chassis of claim 18, wherein the first frame is configured to mount a plurality of first modules, and the second frame is configured to mount a plurality of second modules.

* * * * *